Figure 1:
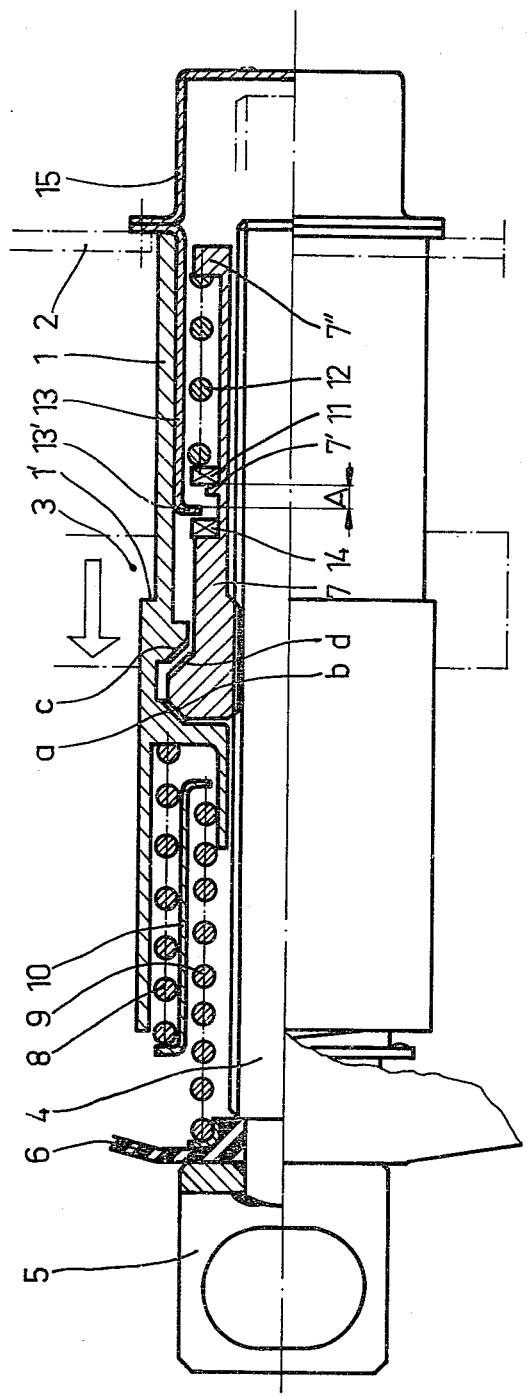

United States Patent [19]

Sander et al.

[11] 4,138,002

[45] Feb. 6, 1979

[54] SLACK ADJUSTER FOR A RAIL VEHICLE BRAKE SYSTEM

[75] Inventors: Nils B. L. Sander, Osby; Bertil S. P. Ottosson, Malmo, both of Sweden

[73] Assignee: SAB Industri AB, Malmo, Sweden

[21] Appl. No.: 874,214

[22] Filed: Feb. 1, 1978

[30] Foreign Application Priority Data

Feb. 9, 1977 [SE] Sweden ................................ 7701400

[51] Int. Cl.² ...................... F16D 65/56; F16D 65/66
[52] U.S. Cl. .................................. 188/196 D; 188/202
[58] Field of Search ................. 188/52, 153 R, 196 D, 188/202, 203

[56] References Cited

U.S. PATENT DOCUMENTS 4,036,332  7/1977  Sander ............................. 188/196 D

FOREIGN PATENT DOCUMENTS 1680381  7/1971  Fed. Rep. of Germany.
1136670  12/1968  United Kingdom.

*Primary Examiner*—Duane A. Reger
*Attorney, Agent, or Firm*—Laurence R. Brown

[57] ABSTRACT

A one-nut slack adjuster with a nut axially disposed having clutch surfaces and on non-self-locking engagement on a spindle coaxially positioned within a tube moving axially to apply brakes has a spring biased thrust bearing held forwardly on the nut in the brake application direction disposed to engage a fixed position control member and when the nut is moved axially forwardly a predetermined desired slack distance thereby to bias the nut backwardly. A second trust bearing on this nut is placed forward of the control member to engage it at a distance from rest less than the clutch separation distance.

In a double acting embodiment a further trust bearing spring biased between the nut and tube in a position forward of the control member holds the nut in a forward direction in clutch engagement.

A further feature is a barrel spring arrangement foreshortening the assembly by a sleeve converting two coaxially disposed spring sections in series.

5 Claims, 2 Drawing Figures

SLACK ADJUSTER FOR A RAIL VEHICLE BRAKE SYSTEM

This invention relates to a slack adjuster for a rail vehicle brake system, including an adjuster tube, on which an axial brake force is to act, a spindle axially movable in the tube, a nut in non-self-locking thread engagement with the spindle, two opposite clutch surfaces on the nut for cooperation with and at a shorter axial distance from each other than corresponding clutch surfaces on the tube, and a barrel spring acting on the spindle from the tube in the brake application direction.

Such an adjuster is commonly in the art referred to as an one-nut adjuster. Similar designs are for example known through the following patent publications: U.S. Pat. No. 3,177,985, German Pat. No. 2,316,822, German Pat. No. 2,337,420 and U.S. Pat. No. 4,036,332. The state of the art for the present invention is, however, best exemplified by GB Pat. No. 1,136,670 and German Pat. No. 1,680,381. The two different slack adjusters shown in these two latter patent publications have very much in common, also the main disadvantage of containing a relatively great number of parts. This means that the manufacturing and mounting is comparatively expensive but also that the risk for malfunction cannot be disregarded. This latter aspect is of outmost importance, as the slack adjuster transmits the braking force from a brake actuator to a brake block or pad and the safety requirements thus are high.

The number of parts may be diminished and the way they are cooperating may be improved if according to the invention the nut is provided with a thrust bearing, which is resiliently held forward in the brake application direction against a nut projection, and that a control means fixed relative to the tube is situated in front of the bearing in the rest position at a distance corresponding to the desired slack.

A slack adjuster according to the invention may be used separately in a brake rigging, but it may also be built into a brake unit. In this latter case and in order to obtain a simple and reliable design the control means preferably is a sleeve, which is coaxial with the tube, is provided with a radially inwardly directed flange for cooperation with the bearing and is attached to the brake unit housing.

The adjuster will decrease a slack grown too large due to wear of the brake block or pad to the desired value in one brake operation. When it is necessary to replace a worn-out brake block or pad it is desired to have the possibility to bring back the spindle of the adjuster to the original position by a force exerted thereon. This is according to the invention possible in that the nut is provided with a further thrust bearing which in the rest position is situated in front of the control means at a distance less than the distance difference between the clutch surfaces on the tube and the nut respectively. The nut will rotate on this further bearing at the application of a force on the spindle in the direction opposite the brake application direction.

When the adjuster also shall be able to increase a too small slack or in other words be double-acting the nut has to be provided with a further thrust bearing, which is resiliently held backwards against a tube projection, situated in front of the control means.

In order to obtain the necessary length for the barrel spring without having to increase the length of the slack adjuster itself the barrel spring may have the form of two compression springs, one arranged coaxially inside the other and coupled in series by means of a spring sleeve or the like, connecting the forward end of the one spring with the rearward end of the other.

Figure 2:
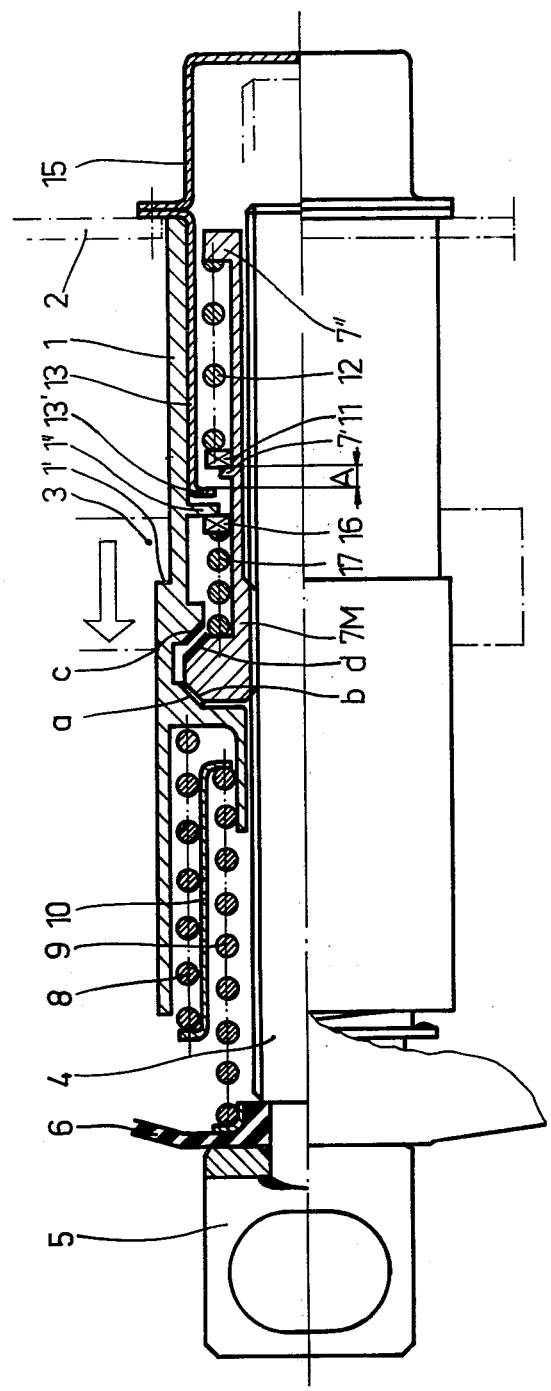

The invention will be described in further detail below reference being made to the accompanying drawings, in which FIG. 1 is a side view, partly in section, of a first and preferred embodiment of the invention and FIG. 2 is a corresponding view of a second embodiment.

The two embodiments have many members in common and the same numerals are used for these.

Turning first to the preferred embodiment according to FIG. 1 an adjuster tube 1 is axially movable in a brake unit housing, which is only indicated by a rear wall 2. A brake force may be axially applied to the adjuster tube 1 in a brake application direction (indicated by an arrow) via a brake force applying member 3, actuated in a way not further described and acting on an adjuster tube shoulder 1'.

A threaded spindle 4 is axially movable coaxially inside the adjuster tube 1. An adjuster ear 5 is attached to the spindle 4 and is intended for connection to further parts (not shown) of a brake rigging. A rubber boot 6 will prevent moisture and dirt from entering the brake unit housing.

A nut 7 is in non-self-locking thread engagement with the spindle 4 and is provided with two preferably toothed opposite clutch surfaces b and d for cooperation with and at a shorter axial distance from each other than corresponding, also preferably toothed clutch surfaces a and c on the adjuster tube 1.

Acting on the spindle 4 in the brake application direction (indicated by the arrow) and supported by the adjuster tube 1 is a barrel spring in the form of two compression springs 8 and 9, one arranged coaxially inside the other and coupled in series by means of a spring sleeve 10. This sleeve 10 connects the forward end of the one spring 8 with the rearward end of the other 9 but will also act as a guiding member for the springs together with the adjuster tube 1. In a design with two springs coupled in series any other means for connecting the springs than the spring sleeve 10 may be used, for example two rings (corresponding to the two flanges on the sleeve 10) and bars or strings therebetween for transmitting pull forces.

On a rear extension thereof the nut 7 is provided with a first thrust bearing 11 resiliently held against a fore nut projection 7' by a bearing spring 12 supported by a rear nut projection 7'.

A control means for the slack adjuster is a sleeve 13 attached to the rear wall 2 of the brake unit housing and thus is fixed relative to the tube. The sleeve 13 is coaxial with the tube 1 and is provided with a radially inwardly directed flange 13', which is situated in front of the bearing 11 in the rest position at a distance called the control distance A and corresponding to the desired slack.

For a purpose further described below the nut 7 may also be provided with a further thrust bearing 14, which in the shown rest position is situated in front of the control sleeve flange 13' at a distance less than the distance in the shown position between the clutch surfaces c and d on the tube 1 and the nut 7 respectively.

Also attached to the rear wall 2 of the brake unit housing is a cap 15 for preventing dust, dirt and moisture from entering the mechanism.

The slack adjuster shown in FIG. 1 and described above will function in the following way:

In the shown rest position the clutch ab will be held in engagement by the barrel spring 8-10, whereas the clutch cd is disengaged. The control distance A will prevail between the thrust bearing 11 and the control sleeve flange 13'.

At the application of a force (the brake force) on the adjuster tube 1 in the direction of the arrow via the brake force applying member 3 the whole mechanism except the parts 13 and 15 attached to the fixed rear wall 2 of the brake unit housing will move forward as a unit.

If now the slack between the brake block or pad and the wheel or the disc respectively is the desired or thus corresponds to the control distance A in the slack adjuster the brake block or pad will come into contact with the wheel or disc respectively and will start to exert a brake force thereon, so that the force of the barrel spring 8-10 will be overcome and the clutch cd will be engaged for transmitting the brake force. In this situation the control sleeve flange 13' will be in contact with the thrust bearing 11 but no slack adjusting takes place.

At the return stroke under the action of a return spring (not shown) in the brake system the clutch ab will again come into engagement and the mechanism will return to its shown position ready for a new brake application operation.

At a brake application with a too large slack in the brake system the nut 7 will be stopped by the control sleeve flange 13' after a distance A and will rotate relative to the spindle 4 on the bearing 11. This means that the spindle 4 will be pushed to the left in the drawing until a slack corresponding to the control distance A has been re-established. If the excessive slack is considerable or more than about 50 mm all of it may not be taken up during the brake application stroke. The remaining part of the excessive slack is then taken up at the return stroke. If the excessive slack develops during the braking it will be reduced to the desired value at the return stroke. This is in fact the normal case at the normal wear of the brake block or pad.

In the case that it is desired manually to bring back the spindle (to the right in the Figure), for example at the replacement of a worn out brake block or pad, it will only be necessary to apply a force to the right on the spindle 4 exceeding the force from the barrel spring 8-10. The first clutch ab will then be disengaged, whereas the second clutch cd will not be able to engage. Instead the nut 7 will rotate on the further thrust bearing 14 cooperating in this case with the control sleeve flange 13'.

In FIG. 2 there is shown, not a single-acting adjuster as in FIG. 1, but a double-acting one. From the FIG. 1 embodiment most of the parts may be recognized and have the same numerals: the adjuster tube 1 with its shoulder 1', the brake unit housing end wall 2, the brake force applying member 3, the spindle 4, the adjuster ear 5, the boot 6, the barrel spring 8-10, the thrust bearing 11, the bearing spring 12, the control sleeve 13 with its flange 13' (forming the control distance A with the bearing 11) and the cap 15.

The nut 7 in the FIG. 1 embodiment is here slightly modified and is called 7M. Its clutch surfaces b and d cooperates with the clutch surfaces a and c on the adjuster tube 1. The compression spring 12 is supported by the rear nut projection 7" and holds the thrust bearing 11 resiliently against the fore nut projection 7'.

The nut 7M is also provided with a further thrust bearing 16, which is resiliently held backwards by a compression spring 17 against an adjuster tube projection 1", situated slightly forward of the control sleeve flange 13' in the shown rest position.

The double-acting slack adjuster according to FIG. 2 will function in the following way:

If the slack corresponds to the control distance A or is larger, the function will be the same as for the single-acting version according to FIG. 1.

If on the other hand the slack is too small the spindle 4 will be stopped at the application stroke before the thrust bearing 11 has reached the control sleeve flange 13'. In this case the clutch ab will disengage and the nut 7M may rotate relative to the spindle 4 on the further thrust bearing 16, until the thrust bearing 11 contacts the control sleeve flange 13' and the second clutch cd will engage.

A manual retraction of the spindle 4, for example at the replacement of a worn out brake block or pad, is possible due to the interaction between the further thrust bearing 16 and the adjuster tube projection 1" in this case.

The slack adjuster according to the invention may in its two versions shown and described be provided with an arrangement for manually adjusting the position of the spindle 4. The cap 15 may be replaced by a member rotatable from the outside and being connectable to the adjuster tube 1 for rotating the same and thus the nut 7 or 7M relative to the spindle 4.

It is again to be observed that although the adjuster is shown as being built into a brake unit it may quite as well be used separately in any brake rigging.

Many modifications are possible within the scope of the appended claims.

We claim:

1. A slack adjuster for a rail vehicle brake system, comprising in combination, an axially movable adjuster tube adapted to receive an axially applied braking force in a brake application direction, a spindle axially movable within the tube, a nut in non-self-locking thread engagement with the spindle, two axially opposed clutch surfaces on the nut separated by a predetermined axial distance, two mating clutch surfaces on the tube separated by a greater axial distance than said predetermined distance between the nut clutch surfaces, a barrel spring coupled between the tube and the spindle biasing the spindle in the brake application direction, a thrust bearing about said spindle and said nut, a bias spring engaging the nut holding said thrust bearing in the brake application direction against a projection on said nut, and a control member fixed relative to axial movement of said tube having a member engaging said thrust bearing after the nut is moved by the spindle in the brake application direction a predetermined slack distance A from rest position.

2. A slack adjuster according to claim 1 having said control member attached to a fixed brake housing and comprising a tube coaxial with said tube with an inwardly directed flange disposed to engage said thrust bearing thereby to apply the force of the bias spring to resist movement of said nut axially in the brake application direction.

3. A slack adjuster according to claim 1, further comprising a second thrust bearing disposed in a rest position to engage said control member when moved an axial position opposite the brake application direction a distance less than the distance difference between the clutch surfaces on the tube and nut respectively.

4. A slack adjuster according to claim 1 wherein the tube has a projection disposed axially in the brake application direction from the control member, and comprising a further thrust bearing spring biased between the nut and said tube projection to bias the nut forwardly in the direction of brake application.

5. A slack adjuster according to claim 1 foreshortened in length by construction of said barrel spring as two coaxial springs one within the other and coupled to act in series by means of a spring sleeve connecting the forward end in the direction of brake application of one coaxial spring with the rearward end of the other coaxial spring.

* * * * *